US009696802B2

(12) United States Patent
Priyantha et al.

(10) Patent No.: US 9,696,802 B2
(45) Date of Patent: Jul. 4, 2017

(54) SHORT RANGE WIRELESS POWERED RING FOR USER INTERACTION AND SENSING (71) Applicant: MICROSOFT TECHNOLOGY LICENSING LLC, Redmond, WA (US)

(72) Inventors: Nissanka Arachchige Bodhi Priyantha, Redmond, WA (US); Douglas Christopher Burger, Bellevue, WA (US); Gerald Reuben DeJean, Redmond, WA (US); Jie Liu, Medina, WA (US); Dimitrios Lymperopoulos, Bellevue, WA (US); Deepak Ganesan, Northhampton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/847,900

(22) Filed: Mar. 20, 2013

(65) Prior Publication Data
US 2014/0285416 A1 Sep. 25, 2014

(51) Int. Cl.
*G09G 5/00* (2006.01)
*G06F 3/01* (2006.01)
*H04B 5/00* (2006.01)

(52) U.S. Cl.
CPC ........... *G06F 3/014* (2013.01); *H04B 5/0037* (2013.01); *Y02B 60/50* (2013.01)

(58) Field of Classification Search
CPC ..... G06F 1/163; G06Q 20/3278; G06Q 30/06
(Continued)

(56) References Cited

U.S. PATENT DOCUMENTS 5,832,296 A * 11/1998 Wang .................... G06F 3/0338
340/12.53
6,882,128 B1 * 4/2005 Rahmel et al. ............... 320/101
(Continued)

OTHER PUBLICATIONS

KYE Systems Corp., Ring mouse, retrieved Jan. 29, 2013 from http://www.geniusnet.com/wSite/public/Mmo/4/Ring_Mouse_f. jpg, p. 1.
(Continued)

*Primary Examiner* — Peter D McLoone
(74) *Attorney, Agent, or Firm* — Lyon & Harr, LLP; Katrina A. Lyon (57) ABSTRACT In general, the short range wireless powered ring described herein pertains to a finger-worn ring. In one embodiment the ring has a small interaction area towards the palm of the hand that employs sensors to sense user input and can interpret this input and other data. For example, the ring can interpret user input as scroll and select input actions. The ring communicates user interactions and other data wirelessly using a low-power wireless solution. The ring contains a coil and other circuitry for energy harvesting from short range wireless enabled devices such as, for example, NFC enabled phones, while users interact with their devices. A built in rechargeable battery is used to store the scavenged energy. The ring may also contain physiological and inertial sensors. The ring can provide a readily available input device of small form factor that has an easily accessible energy source for ease of use.

20 Claims, 5 Drawing Sheets (58) Field of Classification Search
USPC ....... 345/156; 455/41.1, 41.2, 410; 235/379; 340/572.1; 463/36–37, 39
See application file for complete search history.

(56) References Cited

U.S. PATENT DOCUMENTS

| | | | |
|---|---|---|---|
| 7,042,438 B2* | 5/2006 | McRae | A63F 13/06 345/156 |
| 7,268,517 B2* | 9/2007 | Rahmel et al. | 320/101 |
| 7,702,282 B2 | 4/2010 | Sandegard | |
| 8,106,749 B2* | 1/2012 | Ina et al. | 340/12.22 |
| 8,112,066 B2* | 2/2012 | Ben Ayed | 455/411 |
| 8,179,604 B1* | 5/2012 | Prada Gomez et al. | 359/630 |
| 8,478,195 B1* | 7/2013 | Hewinson | 455/41.1 |
| 8,478,196 B1* | 7/2013 | Hewinson | 455/41.1 |
| 8,500,031 B2* | 8/2013 | Naelon | 235/492 |
| 8,502,769 B2* | 8/2013 | Kim | G06F 3/033 345/156 |
| 8,526,880 B2* | 9/2013 | Foster | 455/41.1 |
| 8,548,380 B2* | 10/2013 | Cox | H04W 52/0274 235/380 |
| 8,559,987 B1* | 10/2013 | Fisher | 455/466 |
| 8,615,374 B1* | 12/2013 | Discenzo | 702/127 |
| D705,228 S* | 5/2014 | Peters | D11/26 |
| 8,742,623 B1* | 6/2014 | Biederman et al. | 307/80 |
| 8,820,649 B2* | 9/2014 | Goldman et al. | 235/492 |
| 8,879,985 B2* | 11/2014 | Ochikubo | G06F 13/1605 340/10.1 |
| 8,879,986 B2* | 11/2014 | Fisher | 455/41.1 |
| 8,910,879 B2* | 12/2014 | Goldman et al. | 235/492 |
| 9,112,543 B2* | 8/2015 | McFarthing | H04B 5/0037 |
| 9,300,363 B2* | 3/2016 | Cox | H04W 52/0274 |
| 9,385,786 B2* | 7/2016 | Clement | H02J 7/0052 |
| 9,495,575 B2* | 11/2016 | Kim | H04B 1/385 |
| 2005/0052412 A1* | 3/2005 | McRae | A63F 13/06 345/158 |
| 2005/0186994 A1* | 8/2005 | Rahmel et al. | 455/572 |
| 2008/0014989 A1* | 1/2008 | Sandegard et al. | 455/557 |
| 2008/0088468 A1* | 4/2008 | Kim | G06F 3/033 340/686.1 |
| 2010/0007511 A1 | 1/2010 | Ina et al. | |
| 2010/0030695 A1 | 2/2010 | Chen | |
| 2011/0007035 A1* | 1/2011 | Shai | 345/179 |
| 2011/0199305 A1* | 8/2011 | Suh | G06F 3/014 345/158 |
| 2011/0212687 A1 | 9/2011 | Foster | |
| 2011/0221672 A1* | 9/2011 | Osterhout | G02B 27/017 345/156 |
| 2011/0260839 A1 | 10/2011 | Cook et al. | |
| 2011/0313922 A1* | 12/2011 | Ben Ayed | 705/42 |
| 2012/0024947 A1* | 2/2012 | Naelon | 235/380 |
| 2012/0083205 A1* | 4/2012 | Marcu et al. | 455/41.1 |
| 2012/0178365 A1 | 7/2012 | Katz | |
| 2012/0309354 A1* | 12/2012 | Du | 455/411 |
| 2012/0315843 A1* | 12/2012 | Cox | H04B 5/00 455/41.1 |
| 2013/0005241 A1* | 1/2013 | Ochikubo | 455/41.1 |
| 2013/0027341 A1 | 1/2013 | Mastandrea | |
| 2013/0050087 A1 | 2/2013 | Tien et al. | |
| 2013/0127980 A1* | 5/2013 | Haddick et al. | 348/14.08 |
| 2013/0157565 A1* | 6/2013 | Clement et al. | 455/41.1 |
| 2013/0203345 A1* | 8/2013 | Fisher | 455/41.1 |
| 2013/0260689 A1* | 10/2013 | Haverinen et al. | 455/41.2 |
| 2013/0290522 A1* | 10/2013 | Behm, Jr. | 709/224 |
| 2014/0028547 A1* | 1/2014 | Bromley et al. | 345/156 |
| 2014/0065961 A1* | 3/2014 | Cox | 455/41.1 |
| 2014/0101755 A1* | 4/2014 | Tang | 726/20 |
| 2014/0138447 A1* | 5/2014 | Goldman et al. | 235/492 |
| 2014/0138449 A1* | 5/2014 | Goldman et al. | 235/492 |
| 2014/0139422 A1* | 5/2014 | Mistry et al. | 345/156 |
| 2014/0139454 A1* | 5/2014 | Mistry et al. | 345/173 |
| 2014/0139486 A1* | 5/2014 | Mistry et al. | 345/175 |
| 2014/0139637 A1* | 5/2014 | Mistry et al. | 348/46 |
| 2014/0143737 A1* | 5/2014 | Mistry et al. | 715/854 |
| 2014/0143784 A1* | 5/2014 | Mistry et al. | 718/102 |
| 2014/0176439 A1* | 6/2014 | Keller | G06F 3/014 345/159 |
| 2014/0180851 A1* | 6/2014 | Fisher | 705/16 |
| 2014/0187150 A1* | 7/2014 | McFarthing | 455/41.1 |
| 2014/0267024 A1* | 9/2014 | Keller | G06F 3/017 345/156 |
| 2014/0308930 A1* | 10/2014 | Tran | 455/414.1 |
| 2015/0133193 A1 | 5/2015 | Stotler | |
| 2015/0160693 A1 | 6/2015 | Stotler | |
| 2015/0220922 A1* | 8/2015 | Elangovan | G06Q 20/40 705/44 |
| 2016/0034742 A1* | 2/2016 | Kim | H04B 1/385 382/124 |

OTHER PUBLICATIONS

"International Search Report & Written Opinion for PCT Patent Application No. PCT/US2014/031145", Mailed Date: Jun. 25, 2014, Filed Date: Mar. 19, 2014, 9 Pages.

* cited by examiner

SHORT RANGE WIRELESS POWERED RING FOR USER INTERACTION AND SENSING

BACKGROUND

With the proliferation of various types of computing devices and computing applications, varied types of input devices have also proliferated. In the computing world an input device is a piece of computer hardware that is used to provide data and control signals to an information processing system. Examples of input devices include, for example, keyboards, mice, scanners, digital cameras, and joysticks, among others. Input devices can be classified by mode of input, whether the input generated by the device is discrete or continuous, and the number of degrees of freedom involved (e.g., two dimensional or three dimensional).

As discussed above, input devices include mice, which are a type of pointing input device. A pointing device is any type of human interface device that allows a user to input spatial data into a computer. In the case of a typical mouse, a two dimensional input device, this is usually done by detecting movement across a physical surface. Three dimensional pointing devices also exist and these operate by reporting their angle of deflection. In both of these cases, movements of the pointing device are echoed on a screen or other display device by movements of a pointer on the display.

Sometimes input devices can be combined to allow for two different types of input. For example, joysticks and buttons are often combined on video game controllers.

Devices can be used for sensing. Such sensing devices can be used, for example, for sensing biological signals such as heart rate and galvanic skin response, as well as physical phenomena such as acceleration and orientation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The short range wireless powered ring described herein is a wearable accessory in the form of a finger-worn ring that harvests energy from a short range wireless-enabled device. Short range wireless devices or short range wireless enabled devices as used herein refer to magnetically coupled wireless charging and communication devices. These can include devices such as, for example, Radio Frequency identification (RFID) tags such as Near Field Communication (NFC) tags.

One embodiment of the short range wireless powered ring described herein has a small interaction area towards the palm of a user's hand. This small interaction area or surface contains actuators that when activated allow the ring to be used as an input device that allows, for example, scroll and select capability in a manner similar to a mouse. The ring thus provides a readily available input device that is of small form factor while having an easily accessible energy source for ease of use.

Other embodiments of the ring are primarily sensing devices that measure, for example, a user's Galvanic Skin response (GSR), blood pressure and heart rate, or that measure physical conditions such as rotation, orientation, acceleration and temperature. It should be noted that the actuators and sensors of the various embodiments described herein can be combined so as to provide an energy scavenging ring that can be used both as an input device and as a sensing device.

The short range wireless powered ring contains a coil and other circuitry for energy harvesting from various short range wireless devices, such as, for example, near field communication (NFC) enabled phones. A built-in rechargeable battery is used to store the harvested energy.

The short range wireless powered ring may also have a wireless link that encompasses a short range wireless communication capability. For example, in one embodiment, the short range wireless powered ring transmits data received from the sensors on the ring wirelessly using this short range wireless communication capability to another device that is to be controlled or that processes the data for other purposes. The short range wireless communication ability can also be used by the ring to increase the duty cycle of the device the ring is scavenging energy from.

The ring may also have a wireless link that employs a radio frequency (RF) radio such as a Bluetooth radio, Bluetooth Low Energy (BLE) radio, Zigbee radio, or a WiFi radio to communicate with other mobile devices such as phones or infrastructure devices such as wireless access points.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the short range wireless powered ring, reference is made to the accompanying drawings, which form a part thereof, and which show by way of illustration examples by which the short range wireless powered ring described herein may be practiced. It is to be understood that other embodiments may be utilized and structural changes may be made without departing from the scope of the claimed subject matter.

1.0 Short Range Wireless Powered Ring

The following sections provide an introduction, an overview of the short range wireless powered ring, as well as exemplary embodiments of the ring. Details of various embodiments and components of the short range wireless powered ring are also provided.

1.1 Introduction

Wireless energy or power transmission deals with the transmission of electrical energy from a power source to another device or load without using man-made conductors. For wireless energy transmission to be efficient a large part of the energy sent out by the power generating source must arrive at the receiver of the other device or load.

The most common form of wireless power transmission or charging is by direct induction. Inductive charging is a method of transforming power wirelessly. In inductive charging a power generating source is placed near a power storing or transferring source. An electromagnetic field is created between the two objects and the power is moved between the power generating source and the power consuming or power storing device. In inductive charging the power generating source and the destination system or device are placed close to each other. When an electric current is run through a coil of copper wire on the power generating device this coil generates a short range magnetic field. A second coil, for example on the power storing device, placed within this magnetic field will cause an electric current to flow through the second coil. This power can then be directly consumed by the destination device, or can be stored in the destination device. Resonant inductive coupling where the coils at the energy source and the load are tuned to resonate at the magnetic field frequency can transfer a significant portion of power even when the two coils are separated by a short distance.

Figure 1:
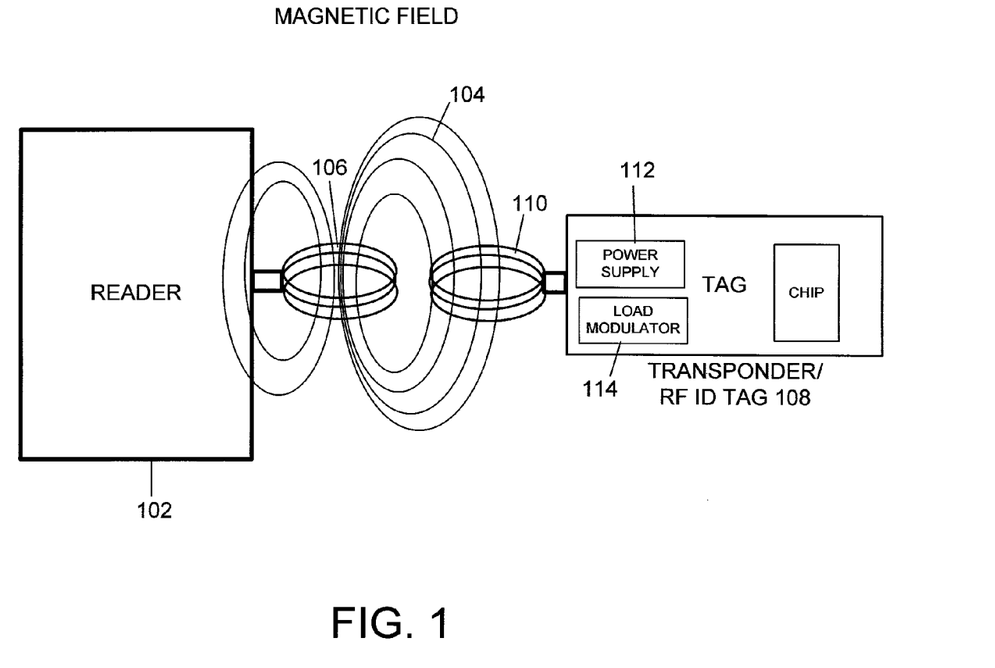
FIG. 1 depicts an exemplary schematic of a short range wireless communications system of a Radio Frequency Identification (RFID) reader and a RFID tag.

Near field communication (NFC), which is based on resonant inductive coupling, can be used for wireless power transmission and charging and can generate energy that is useful for energy harvesting. NFC is a set of standards for smart phones and similar devices to establish radio communication with each other by touching them together or bringing them into close proximity to each other. Communication is possible between a NFC enabled device and an unpowered NFC chip, called a tag. FIG. 1 shows an example of how NFC works. In this figure a RFID reader 102 generates a magnetic field 104 via a coil 106. An RFID tag 108 is powered by the magnetic field 104 generated by the RFID reader 102 (via coil 110). Basically the reader 102 and tag 108 are magnetically coupled and the tag 108 is powered by the reader-generated magnetic field 104. The RFID tag 108 includes a power supply 112 and a load modulator 114. The RF ID tag 108 communicates with the reader 102 by load modulation which is generated by the load modulator 114.

Near field communication energy is one form of energy that can be harvested and is one type of wireless energy that can be used to power the short range wireless powered ring described herein. In typical NFC energy harvesting a tag can harvest approximately 25 mW. One of the challenges in NFC energy scavenging is, however, the low duty cycle of an NFC-enabled device (on the order of 1.96 mW). One way to increase the duty cycle is by tag mimicking discussed later, which can increase the duty cycle by up to 80% (20 mW). Tag mimicking allows on demand energy harvesting.

In addition to harvesting wireless communication energy, such as near field communication energy from a short range wireless enabled device, charging pads also provide a means to charge electronic devices. These charging pads typically include an induction coil to create an alternating magnetic field from within a charging base station in the charging pad and a second induction coil in a portable device takes power from the magnetic field and converts it back to electrical current to charge a battery in the portable device.

1.2 Overview of the Technique

The short range wireless powered ring described herein is a wearable accessory in the form of a finger-worn ring. While having the same form factor and weight as a typical ring, in one embodiment the short range wireless powered ring has a small (for example, in one embodiment a ~5 mm×5 mm) interaction surface facing the user's hand. This interaction surface has actuators that enable actuation modalities such as, for example, tactile or capacitive-based scroll and select functionalities, while being wirelessly connected (or optionally even physically connected) to devices such as, for example, mobile phones and head mounted displays. The short range wireless powered ring recharges its limited capacity internal battery by on-demand short range wireless energy harvesting.

The short range wireless powered ring enables several novel interaction modalities such as providing navigation for audio menu driven user interfaces (UI), and enhancing augmented reality-based interactions with the ability to scroll and select.

The short range wireless powered ring may have sensing capability obtained from sensors on the ring. For example, it may sense various physiological signals such as heart-rate, blood pressure, and Galvanic Skin Response (GSR) which can be used to determine user stress level. This physiological data can be either stored in the ring for off-line analysis, or can be used for "on-line" sensing when the user interacts with a device (for example a mobile phone). The sensor data collected during the on-line activities can provide user context information (for example, stress level) for applications that the user is interacting with (for example, to help to better manage word choices in an electronic mail application when the user is stressed). The ring may also contain other sensors such as low-power cameras, inertial sensors (e.g. accelerometers and gyroscopes) for other sensing tasks such as identifying user hand gestures and other physical activities.

The short range wireless powered ring described herein is challenged with respect to its energy supply because of its small size and weight limitations. It can only have a limited energy store because of battery size limitations. Frequent recharging using conventional techniques such as plugging in to a power supply is cumbersome. The ring as a result can employ opportunistic charging from a short range wireless enabled device, such as from a NFC-enabled phone or a wireless charging pad. For example, the ring can be charged every time a user holds the phone in his hand with the ring. In case the ring's energy supply is completely depleted a user can touch the ring to the short range wireless device to initiate power transmission from the short range wireless device.

Some embodiments of the ring can include components to allow the ring to be used as a stand-alone input device. Some embodiments of the ring can include components to allow the ring to be used as a stand-alone sensing device. Yet other embodiments of the ring can include various combinations of components to allow the ring to be used as both an input device and a sensing device.

A general overview of the short range wireless powered ring having been provided, the following section provides a description of exemplary embodiments of the short range wireless powered ring.

1.4 Exemplary Short Range Wireless Powered Ring Embodiments

Figure 2:
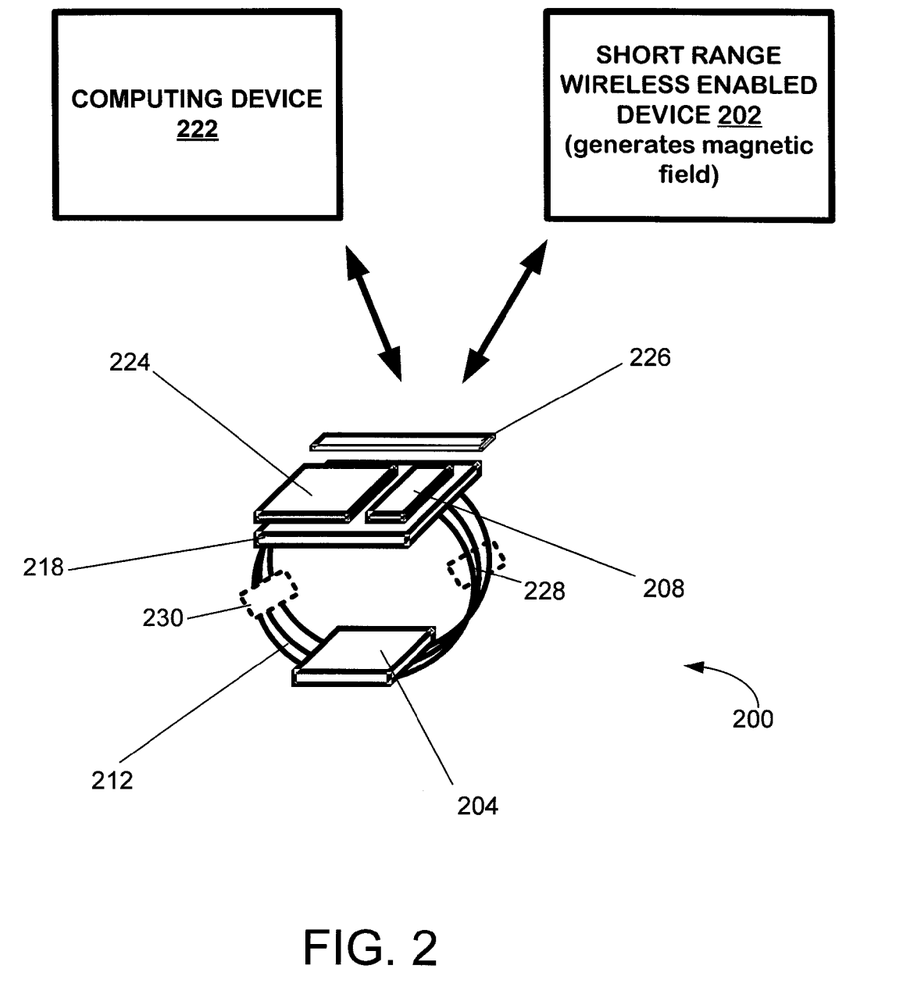
FIG. 2 depicts a schematic of one exemplary embodiment of the short range wireless powered ring described herein that includes actuators to allow the ring to be used as an input device.

FIG. 2 shows an exemplary short range wireless powered ring 200. The body-worn ring 200 harvests short range wireless energy. This short range wireless energy can be, for example, from near field communication (NFC), or from wireless charging solutions using, for example, Qi, an inductive power standard. This short range wireless energy can be emitted by a short range wireless enabled device 202 that is in close proximity to the ring 200. Such a short range wireless capable device 202, could be, for example, a NFC-enabled mobile phone, NFC-enabled tablet computer, a wireless charging pad, or other wireless power generating device.

A small interaction area or surface 204 on the ring 200 includes actuators for generating user input, such as, for example, input from a user by touching the actuators. These user inputs can be used to navigate a visual or audio menu, to scroll and select items on a display or to initiate some action on a remote computing device or on several remote computing devices. In one embodiment the small interaction area 204 is located towards a palm of a user's hand.

Figure 3:
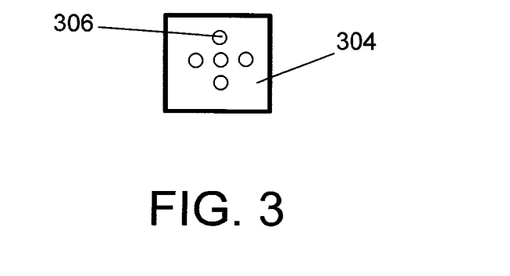
FIG. 3 depicts an exemplary small interaction area on one embodiment of the short range wireless powered ring. The small interaction area is located towards the palm of a user's hand in this embodiment.

FIG. 3 shows a bottom view of the aforementioned small interaction area 304 that includes input actuators 306. The actuators 306 on the surface of the small interaction area can detect actuations such as a user's finger touching them. For example, the actuators can detect a user's contact and this user contact can be interpreted by a microprocessor on the ring. These user contacts can be interpreted by the microprocessor as scrolling actions and other types of user actuation commands, such as, for example, "listen to speech input", "select something", "start something", and so forth.

Referring again to FIG. 2, an inductor 212 and associated circuitry (not shown) which is part of the short range wireless powered ring 200 is used for harvesting the short range wireless energy. The inductor 212 for energy harvesting typically harvests energy from the short range wireless-enabled device 202.

The short range wireless powered ring 200 also includes a battery 218 for storing the harvested energy. This battery 218 typically is a small, rechargeable battery. A radio transceiver 224 communicates the data to a computing device 222 (or other device that receives the sensor data and/or associated control commands based on the sensor data) using the harvested energy (typically stored in the battery 218). In some embodiments the short range wireless powered ring can control a computing device 202 on the ring is harvesting energy from.

The short range wireless powered ring 200 can further include a short range wireless communication capability for communicating with a computing device 222 not on the ring itself and/or with a short range wireless-enabled device 202 (such as the one the ring 200 is scavenging the energy from). This short range wireless communication capability can be, for example, near field communication (NFC) among others. Since the ring 200 has short range wireless communication capability implemented through the magnetic coupling of charging coils data can wirelessly be transmitted to the computing device 222 in order to provide commands or other data to the computing device 222. The communication capability can also be used to communicate with the short-range wireless-enabled device 202 to better scavenge energy from the short range wireless enabled device 202, as will be described later in this specification.

The short range wireless powered ring 200 can optionally further include one or more sensors such as, for example, physiological sensors 228 that sense physiological input from the user. Or the ring 200 can include one or more inertial sensors 230 that sense the inertial data of the ring and the user's hand, as will be described in greater detail with respect to FIG. 4 and later in this specification.

Figure 6:
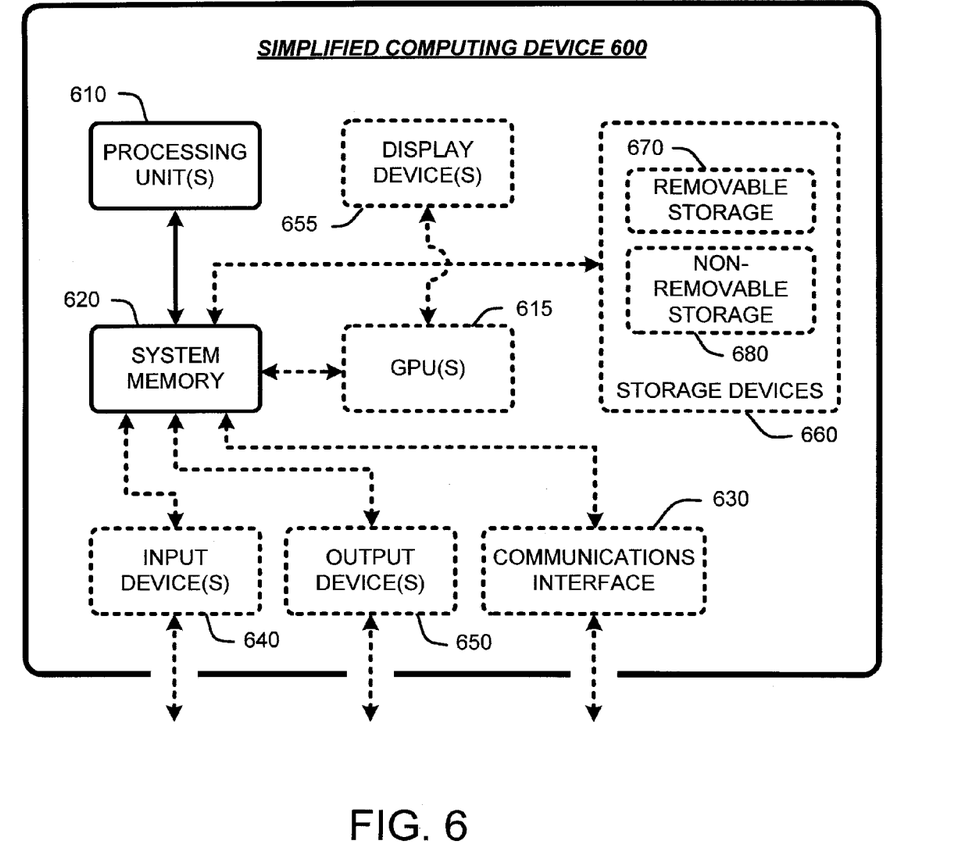
FIG. 6 is a schematic of an exemplary computing environment which can be used to practice the short range wireless powered ring.

The short range wireless powered ring 200 also includes a microprocessor 208 (or other computing device), aspects of which are described in greater detail with respect to FIG. 6. In one embodiment this microprocessor has a CPU, and memory (both RAM and ROM) packaged into a small integrated circuit (chip). The microprocessor 208 implements the control and decision making on the ring. For example, when energy harvesting, the microprocessor 208 monitors the battery 218 level and decides when to activate the energy harvesting. For user input events, the microprocessor 208 detects these events and generates appropriate messages and transmits these messages wirelessly using the radio transmitter/transceiver 224 (which can also be on a chip). The microprocessor 208 also reads the actuators and optionally processes and makes decisions based on this data and/or transmits the data over wireless links. The microprocessor also manages the short range wireless communication between the ring and a computing device. Additionally, the microprocessor 208 manages and partially implements the various wireless communication standards for the radio 224 and the short range wireless communication on the ring.

Figure 4:
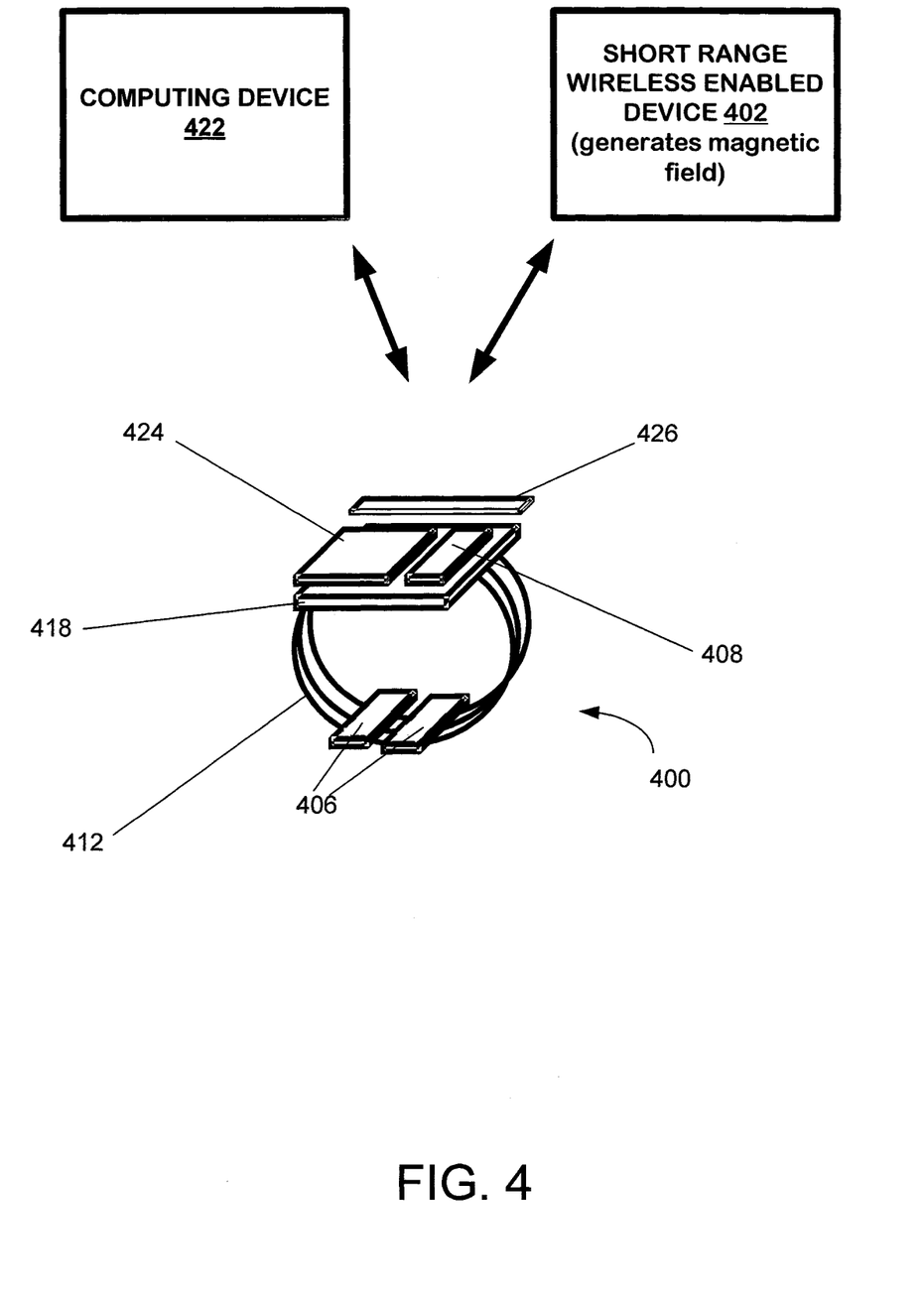
FIG. 4 depicts a schematic of an exemplary embodiment of the short range wireless powered ring described herein. The ring scavenges energy from a device that is generating a magnetic field. It can store this energy and can use it to capture and interpret data from sensors on the ring and transmit this data to a computing device or other electronic device to control it or to control applications on the device.

FIG. 4 shows an exemplary finger-worn ring 400 that harvests short range wireless energy. This ring 400 can have similar components as in the embodiment discussed above with respect to FIG. 2. This short range wireless energy harvested can be, for example, near field communication (NFC) energy. This short range wireless energy can be emitted by a short range wireless enabled device 402 that is in close proximity of the ring 400. Such a short range wireless enabled device 402, could be, for example, a NFC-enabled mobile phone, tablet computer or other computing device or a wireless charging pad.

The short range wireless powered ring 400 includes one or more sensors 406. These sensors 406 can include one or more physiological sensors. In this case the detected input can be physiological data measured on the user. This physiological data is gathered passively without the user explicitly interacting with the sensors.

Furthermore, the sensors 406 of the ring 400 can also include one or more inertial sensors. These inertial sensors can measure inertial data on the ring. This inertial data can include orientation, rotation acceleration, and so forth. This inertial data can be used for many purposes, such as, for example, determining the gesturing of the user. This gesturing can then also be used to control various devices.

The ring 400 also includes an inductor 412 and associated circuitry on the ring that is used to harvest short range wireless energy. A radio transceiver 424 can communicate the detected input from the sensors of the ring 400 to another device 422 using the harvested energy. The ring may also communicate data using short range wireless communication capability as discussed previously with respect to the embodiment shown in FIG. 2.

The short range wireless powered ring 400 also includes a microprocessor 408 (or other computing device), aspects of which are described in greater detail with respect to FIG. 6. In one embodiment this microprocessor has a CPU, and memory (both RAM and ROM) packaged into a small integrated circuit (chip). The microprocessor 408 implements the control and decision making on the ring. For example, when energy harvesting, the microprocessor 408 monitors the battery 418 level and decides when to activate the energy harvesting. The microprocessor 408 also reads the various sensors (such as physiological sensors, physical sensors, inertial sensors and imaging sensors) and optionally processes and makes decisions based on this data or transmits the data over wireless links. The microprocessor 408 also manages the short range wireless communication between the ring 400 and a computing device 422. Additionally, the microprocessor 408 manages and partially implements the various wireless communication standards for the radio 424 and the short range wireless communication on the ring.

The short range wireless powered ring 400 can also optionally include actuators (not shown) that will allow the ring to be used as an input device.

Figure 5:
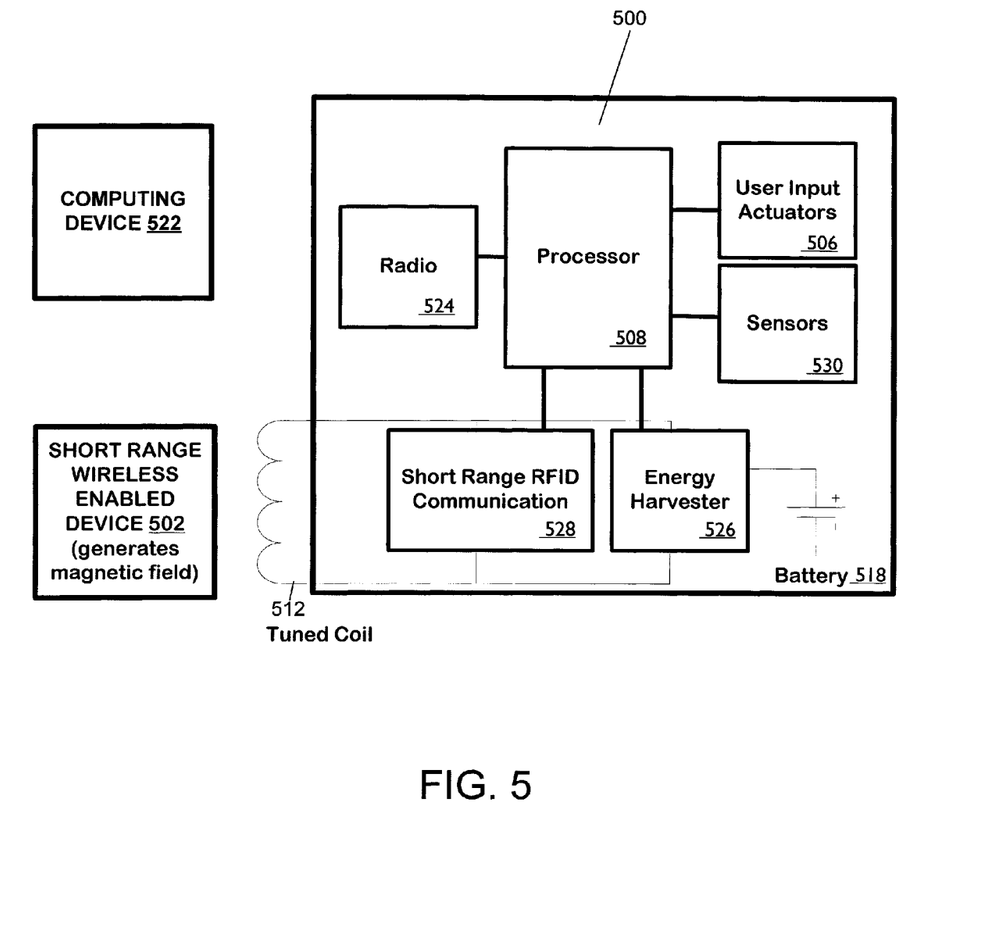
FIG. 5 depicts a schematic of another exemplary embodiment of the short range wireless powered ring. This embodiment includes both actuators to allow the ring to act as an input device and sensors to allow the ring to act as a sensing device.

FIG. 5 shows a functional schematic of an exemplary ring 500 that harvests short range wireless energy. This short range wireless energy harvested can be, for example, near field communication (NFC) energy. This short range wireless energy can be emitted by a short range wireless enabled device 502 that is in close proximity of the ring 500. Such a short range wireless enabled device 502, could be, for example, a NFC-enabled mobile phone, tablet computer or other computing device or a wireless charging pad. The harvested energy can be stored in a battery 518

The short range wireless powered ring 500 includes one or more actuators 506 on the ring that detect user input and allow the ring to be used as an input device. These actuators 506 may or may not be on an interaction surface. These user inputs can be used, for example, to navigate a visual or audio menu, to scroll and select items on a display, or to initiate some action on a remote computing device or remote computing devices.

The short range wireless powered ring 500 also includes one or more sensors 530 that allow the ring to act as a sensing device. These sensors 530 can include one or more physiological sensors. In this case the detected input can be physiological data measured on the user. This physiological data is gathered passively without the user explicitly interacting with the sensors.

Furthermore, the ring 500 can also include one or more sensors 530 that are inertial sensors. These inertial sensors can measure inertial data on the ring. This inertial data can include orientation, rotation acceleration, and so forth. This inertial data can be used for many purposes, such as, for example, determining the gesturing of the user. This gesturing can then also be used to control various devices.

The ring 500 can further include one or more sensors 530 that are physical sensors that measure various physical phenomenon such as temperature, humidity, and other environmental conditions around the ring or a user's hand.

The ring 500 can further include one or more sensors 530 that are imaging sensors or cameras.

The inputs from the various actuators and sensors can be processed by a processor 508 that provides the processing for the ring. This processor 508 could be, for example, a microcontroller, application-specific integrated circuit (ASIC) or field-programmable gate-array (FPGA) or any other form of processing unit or computing device. The processor 508 controls and manages processing of the components of the ring and may also implement (sometimes partially) the various communications protocols for the radio 524 and RFID communication module 528.

The ring 500 also includes an inductor or tuned coil 512 and associated energy harvesting circuitry 526 on the ring that is used to harvest short range wireless energy and charge the battery 518. The coil 512 is tuned for energy harvesting which is based on magnetic coupling. The associated energy harvesting circuitry 526 is managed by the processor 508.

A radio transceiver 524 communicates the detected input from the actuators 506 and sensors 508 of the ring 500 to another device 522 using the harvested energy, using, for example, Bluetooth, Bluetooth Low Energy, or WiFi for communication with devices outside of the ring. The ring 500 may also communicate data using a short range RFID communication module 528 that is an optional module that is used to communicate with devices outside of the ring 500 using RFID protocols (e.g., NFC protocol).

2.0 Details of the Technique

This section describes some of the capabilities and components of the short range wireless powered ring in greater detail.

2.1 Form Factor

The short range wireless powered ring is a wearable accessory in the form of a finger-worn ring. In one embodiment, while having the same form factor and weight as a typical ring, the short range wireless powered ring has a small (for example, an approximately 5 mm×5 mm area) interaction surface that enables actuation modalities. The actuation modalities allow the short range wireless powered ring to control one or more computing devices or other electronic devices. For example, actuators in the interaction surface can detect touch and use this detected touch to control various devices while being wirelessly connected to these devices. For example, these controlled devices could be mobile phones, head mounted displays, video display monitors, or audio output devices. The ring, in some embodiments, can communicate with a computing device or other electronic device over a wireless link. This wireless link can be a short range wireless link or a standard RF link.

2.2 Interaction Surface and Actuators

As discussed above, some embodiments of the short range wireless powered ring have a small interaction surface with actuators to detect various forms of actuations. In one embodiment the interaction surface is facing the user's palm. The actuators on the interaction surface detect a user's touch or other input and can enable various actuation modalities such as tactile or capacitive-based scroll and select functionalities. The actuators can be of various types. For example, the actuators can be capacitive switches or a touch pad that only have to be touched by a person or object in order to operate. Alternately, the sensors can be resistive switches or a touch pad that detect input by measuring the change in resistance when pressure is applied. Alternately, the actuators can be tactile sensors that are sensitive to touch, force or pressure. It should be noted that various combinations of these and other types of sensors can be used in the interaction surface and in embodiments of the ring that do not include an interaction surface.

2.3 Sensors

The short range wireless powered ring can include different types of sensors. These include inertial sensors such as accelerometers and gyroscopes, physiological sensors such as heart rate sensors and Galvanic Skin Response (GSR) sensors, physical sensors such as temperature sensors and electronic compasses, and imaging sensors or cameras, among others. These are discussed in greater detail below.

2.3.1 Inertial and Physical Sensors

As discussed previously, the short range wireless powered ring described herein can include one or more inertial sensors which can include accelerometers and gyroscopes. The ring can also include physical sensors such as temperature sensors, humidity sensors, and a magnetic compass. These sensors can be used to determine the gestures of the user that is wearing the ring, for example the accelerometer and gyroscope can measure the movement of the user's hand while the compass measures the orientation. These determined gestures can then also be used to control a computing device or other devices. Sensors such as temperature sensors and humidity sensors can determine the environmental conditions around user's hand.

2.3.2 Imaging Sensors

The short range wireless powered ring described herein can include imaging sensors (e.g., cameras) to capture images. These images can be used to determine a user's gestures by identifying the location of the user's fingers. These gestures can be used, for example, to control inputs to a computing or other electronic device. In one embodiment of the short range wireless powered ring a camera that measures 1.4 mm×1 mm×1 mm with a resolution of 250× 250 pixels is employed.

2.3.3 Physiological Sensors

The short range wireless powered ring may also include physiological sensors. For example, these physiological sensors may sense various physiological signals such as the Galvanic Skin Response (GSR), which measures the skin resistance and can be used to determine a user's stress level; heart-rate and blood pressure typically measured by the variation of optical reflection or the conductivity of a finger. These measurements can be either stored in the ring for off-line analysis, or can be used for "on-line" sensing when the user interacts with a device or application. The sensor data collected during the on-line activities can provide user context information (e.g., stress level) for applications that the user is interacting with. For example, the user's sensed stress level can be used to help better manage word choices in an electronic mail application when the user is composing an email when he is stressed or can be used to project user emotional state during online social interactions. Various biological signals can be used in wellness applications that keep track of user physical and psychological state over time.

2.4 Energy Harvesting Inductor

As discussed previously, the short range wireless powered ring described herein includes an inductor, for example a tuned inductor, for energy harvesting, which generally forms the band of the ring itself as can be seen in FIGS. 2 and 4. The inductor is used to harvest energy from a short range wireless enabled device such as, for example, a short range wireless enabled phone or an RF ID reader or a wireless charging pad.

2.5 Battery

As discussed previously, the short range wireless powered ring in many embodiments includes a battery for storing the harvested energy. This battery is rechargeable and is preferably of a small size in order to readily be hosted on the short range wireless powered ring.

2.6 Radio Transceiver and Antenna

The short range wireless powered ring in some embodiments includes a radio transceiver that can wirelessly communicate the input received from a user or other data received from the ring (such as, for example, inertial data or physiological data) to a computing device that processes the data. Some embodiments of the ring can also process the data on the ring itself (e.g., using a microcontroller resident on the ring). The radio transceiver uses the harvested energy that is stored in the battery to communicate this data. In one embodiment a Blue Tooth Low Energy radio is used.

2.7 Short Range Wireless Communication Link

As discussed previously, the short range wireless powered ring may include communication capability over an energy harvesting wireless link. For example, this link can use the NFC standard to communicate between the ring and a computing device when the computing device is placed next to the ring such as when a user holds an NFC capable phone in the hand with the ring.

2.8 Microprocessor

As discussed previously, a microprocessor (or other computing device) is part of the short range wireless powered ring. In one embodiment this microprocessor has a CPU, and memory (both RAM and ROM) packaged into a small integrated circuit (chip). The microprocessor implements the control and decision making on the ring. For example, when energy harvesting, the microprocessor monitors the battery level and decides when to activate the energy harvesting. For user input events, the microprocessor detects these events and generates appropriate messages and transmits these messages wirelessly using the radio. For example, the microprocessor can receive a user's input to the sensors of the interaction surface and determine if the user is selecting or scrolling. The microprocessor also reads the various sensors (such as physiological sensors and inertial sensors) and optionally processes and makes decisions based on this data or transmits the data over wireless links. For example, the microprocessor can receive the inertial data from an accelerometer and determine what gestures the user is making. These gestures captured by the accelerometer (optionally with gestures captured by a camera on the ring) can then be used to control a computing device or other electronic device. The microprocessor manages and partially implements the various wireless communication standards for the radio on the ring. Additionally, the microprocessor can also interpret data received from other devices at the short range wireless powered ring. In one embodiment of the ring a PICI16F1823 microprocessor is used. This microprocessor uses a standby current of 20 μA and an active current of 50 μA/mHz.

2.9 Device that is Controlled

Various devices and applications can be controlled using embodiments of the ring described herein. Such applications include but are not limited to augmented reality applications, audio-based menus, and near-eye and remote display menus that need a readily available input device. For example, the actuators can provide mouse or joystick-like functionality to navigate visual and audio menus. The actuators, similar to a computer mouse, can also provide various button clicks for selecting menu items or invoking predefined actions. In some embodiments the device being controlled may the same device that the energy is being harvested from.

2.10 Short Range Wireless Enabled Device from which Energy is Harvested

The short range wireless powered ring harvests energy from a power generating source such as a short range wireless enabled device. For example, such a device could be a smart phone with near field communication capability or a wireless charging pad. Typically the short range wireless powered ring opportunistically harvests energy by inductive charging when a user in using the short range wireless capable device. In some embodiments, if the ring determines the short range wireless enabled device is not emitting energy, the ring can communicate with the device in order to get it to transmit energy. When NFC-based energy harvesting is used, the ring can also increase the duty cycle of the power generating source by tag mimicking.

2.12 Increasing the Energy Harvested with Tag Mimicking

It is possible for the short range wireless powered ring to increase the energy harvested by increasing the duty cycle of the power generating device. This is done, in one embodiment, by tag mimicking. The energy generating device (for example, a RF reader or a NFC-enabled smart phone) typically periodically scans for RF tags/devices. The ring (e.g., the energy harvesting device) then responds to the power generating device with a valid message preamble and invalid message body. The power generating device then assumes a failed communication with the energy harvesting device (e.g., tag) and repeats transmission. This increases the duty cycle of the power generating device and provides a greater amount of energy for harvesting.

3.0 Exemplary Usage Scenarios:

The following paragraphs provide exemplary usage scenarios for the short range wireless powered ring. Many other usage scenarios can be envisioned however.

3.1 Near Field Communication Energy Ring

In this usage scenario, a built-in NFC reader of a mobile phone periodically scans for NFC tags when the screen of the mobile phone is unlocked. The short range wireless powered ring uses a low-power NFC tag emulator to harvest energy when the user holds a screen-unlocked mobile phone in her hand. In this embodiment the short range wireless powered ring uses Bluetooth Low Energy (BLE) to communicate due to its low-power and compatibility with current mobile phones. The short range wireless powered ring may also have bidirectional RF ID (NFC lower layer) communication capability such that it can communicate with the phone when the ring is close to the phone (e.g. user is holding the phone).

3.2 Wireless Charging-Based Energy Scavenging Ring

One embodiment of the short range wireless powered ring described herein uses wireless charging standards for energy harvesting. For example, the ring might use a charging pad for charging the ring, but might use conventional radio communications such as WiFi for communicating with other devices.

4.0 Exemplary Operating Environments:

The short range wireless powered ring described herein is operational within numerous types of general purpose or special purpose computing system environments or configurations. The microprocessor on the ring and the computing device that is controlled by the ring are examples of computing devices that can be employed by the short range wireless powered ring. FIG. 6 illustrates a simplified example of a general-purpose computer system on which various embodiments and elements of the short range wireless powered ring, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the short range wireless powered ring, the device should have a sufficient computational capability and system memory to enable basic computational operations. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device may be specialized microprocessors, such as a DSP, a VLIW, or other microcontroller, or can be conventional CPUs having one or more processing cores, including specialized GPU-based cores in a multi-core CPU. When used in special purpose devices such as the short range wireless powered ring, the computing device can be implemented as an ASIC or FPGA, for example.

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio and speech input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computer 600 via storage devices 660 and includes both volatile and nonvolatile media that is either removable 670 and/or non-removable 680, for storage of information such as computer-readable or computer-executable instructions, data structures, program modules, or other data. Computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of any of the above should also be included within the scope of communication media.

Further, software, programs, and/or computer program products embodying some or all of the various embodiments of the short range wireless powered ring described herein, or portions thereof, may be stored, received, transmitted, or read from any desired combination of computer or machine readable media or storage devices and communication media in the form of computer executable instructions or other data structures.

Finally, the short range wireless powered ring described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. For example, although the various embodiments described herein depict the short range wireless powered device as a ring, other configurations are possible. For example, instead of a ring, a bracelet, a hair pin, glasses, a hat a necklace or earrings could be implemented. The specific features and acts described above are disclosed as example forms of implementing the claims.

What is claimed is:

1. A finger-worn ring that harvests short range wireless energy, comprising:
   a small interaction area on an outer portion of the finger-worn ring facing towards the palm of a user's hand, the small interaction area comprising actuators arranged in a pattern comprising a center actuator and actuators surrounding the center actuator in a circular pattern on the interaction area to sense user input actions for controlling items displayed on a display;
   an inductor and circuitry that is used for scavenging of short range wireless energy from a device that is transmitting the wireless energy for a purpose other than charging;
   a battery that stores the scavenged energy; and
   a microprocessor that monitors battery level and decides when to activate energy scavenging to charge the battery; and
   a wireless link that communicates the user input actions to a computing device using the scavenged energy stored in the battery to control items displayed on a display of the computing device using the communicated user input actions.

2. The finger-worn ring of claim 1, wherein the short range wireless energy is near field communication (NFC) energy.

3. The finger-worn ring of claim 1, wherein the inductor and circuitry for energy scavenging scavenges energy from a short range wireless-enabled device.

4. The finger-worn ring of claim 1, wherein a RF radio is used for the wireless link.

5. The finger-worn ring of claim 1, wherein near field communication is used for the wireless link.

6. The finger-worn ring of claim 1, wherein the actuators can detect user scrolling and selection actions.

7. The finger-worn ring of claim 1, wherein the input actions can be used to control the computing device or another device.

8. The finger-worn ring of claim 1, wherein the small interaction area that is located on the portion of the surface of the ring directed towards a palm of a user's hand comprises five actuators arranged in a diamond pattern wherein four actuators surround the center actuator.

9. The finger-worn ring of claim 1, further comprising sensors that sense at least one of:
   physiological signals of the user;
   inertia of the ring;
   image data; and
   environmental data.

10. A finger-worn ring, comprising:
    one or more sensors on the ring that detect input;
    a small interaction area on an outer portion of the ring, the small interaction area comprising actuators arranged in a pattern comprising a center actuator and actuators surrounding all sides of the center actuator on the interaction area that detect a user's touch and provide scroll and select functionalities;
    an inductor and circuitry on the ring that scavenge short range wireless energy from a first computing device that is transmitting the wireless energy for a purpose other than for charging;
    a battery that stores the scavenged energy;
    a microprocessor that monitors battery level and decides when to activate energy scavenging to charge the battery; and
    a link that transmits the detected input from the one or more sensors and the actuators on the ring to a second computing device using the scavenged energy stored in the battery to control a cursor on a display of the second computing device.

11. The finger-worn ring of claim 10, wherein the link transmits the detected input using short range wireless communications.

12. The finger-worn ring of claim 10, wherein the link transmits the detected input using a RF radio.

13. The finger-worn ring of claim 10, wherein the detected input is used to control another device or application.

14. The finger-worn ring of claim 10, further comprising at least one physiological sensor and wherein the detected input is physiological data of the user.

15. The finger-worn ring of claim 10, further comprising at least one inertial sensor and wherein the detected input is the inertia of the ring.

16. The finger-worn ring of claim 10, further comprising at least one imaging sensor and wherein the detected input is image data.

17. The finger-worn ring of claim 10, wherein the scroll and select functionalities allow a user to scroll through a menu displayed on the display and select a menu item.

18. A ring that is used as an input device and a sensing device, comprising:
- a plurality of actuators on the ring, comprising a center actuator and actuators located on the top, bottom and sides of the center actuator, and select functionalities for controlling objects displayed on a display;
- one or more sensors on the ring that passively sense information;
- an inductor and circuitry that scavenges short range wireless communication energy from a computing device that is transmitting the short range wireless communication energy for a purpose other than charging;
- a battery that stores the scavenged energy;
- a microprocessor on the ring that monitors battery level and decides when to activate energy scavenging to charge the battery; and
- a wireless link that transmits the received input actions and the sensed information to the computing device using the scavenged energy to provide the sensed information to the computing device and to control a cursor on a display of the computing device.

19. The ring of claim 18 wherein the wireless link comprises a RF transceiver that transmits the received input actions and the sensed information to the computing device.

20. The ring of claim 18 wherein the wireless link comprises a short range wireless communication module that transmits the received input actions and the sensed information to the computing device.

* * * * *